Sept. 23, 1969  J. A. McHOLLAN ET AL  3,468,448
OUTLET BOX WITH CLIPS FOR MOUNTING IT IN A WALL STRUCTURE
Filed Jan. 5, 1968
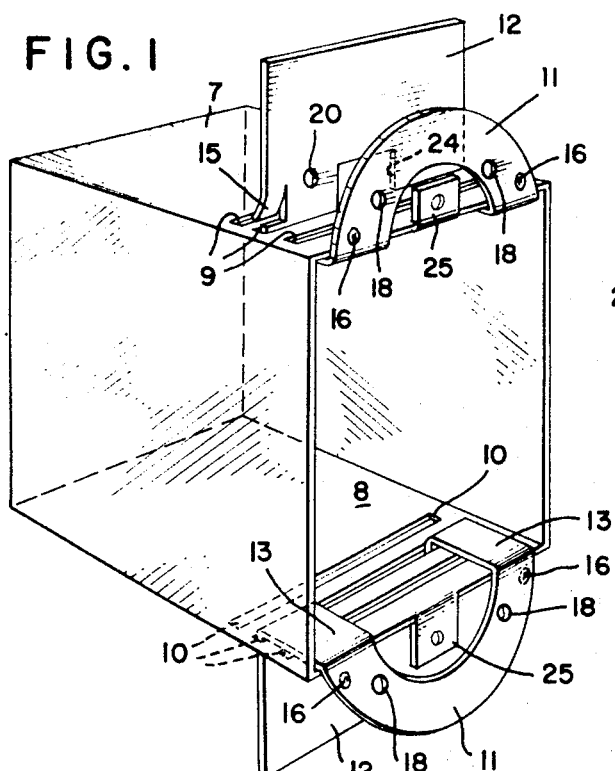
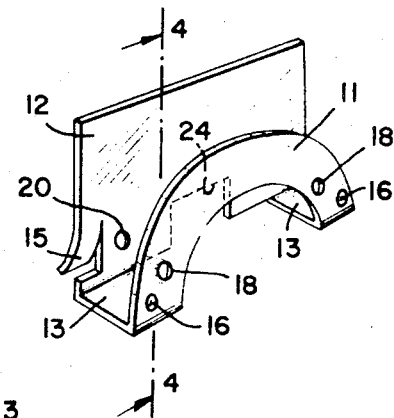
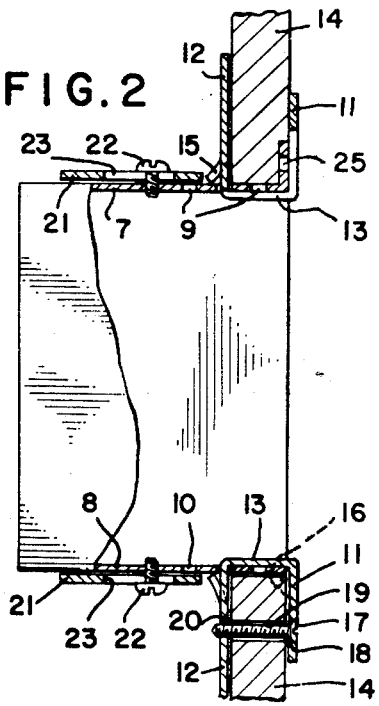
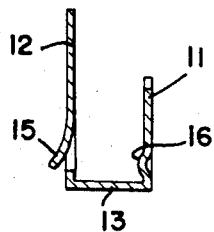
INVENTOR.
JAMES A. McHOLLAN
ANTHONY J. BORUCKI
BY
Philip S. McBean
ATTORNEY United States Patent Office 3,468,448
Patented Sept. 23, 1969

3,468,448
OUTLET BOX WITH CLIPS FOR MOUNTING IT IN A WALL STRUCTURE
James A. McHollan, 19 Old Bridge Drive, Lakewood, N.J. 08701, and Anthony J. Borucki, 4 Essex Place, Dumont, N.J. 07628
Filed Jan. 5, 1968, Ser. No. 695,970
Int. Cl. H02g 3/12; G12b 9/10
U.S. Cl. 220—3.6                  2 Claims

ABSTRACT OF THE DISCLOSURE

Switch boxes and other forms of outlet boxes adapted to be supported in a wall opening by means of U-shaped clips having parallel leg portions spaced apart approximately the thickness of the wallboard or other wall material in which the box is mounted and disposed in the box with the rear leg portion extending out through a slot in the box, over the inner face of the wall structure and the front leg extending over the front edge of the box and over the front face of the wall; latch forming lugs may be struck out of the rear leg portion to snap over the box wall when this leg is pushed out through the slot and a protuberance may be provided on the front leg to snap over the edge of the box to lock the clip in place on the box and for additional securement, a clamping screw may be passed through the front leg and the intervening wall material into the rear leg.

---

Objects of this invention have been to provide simple, inexpensive, effective means for securing outlet boxes in wallboard or other wall forming material, which could be readily combined with the box and with the wall material, which would be light in weight, small in size, which would be acceptable to the trade and which would be generally practical and desirable.

Other desirable objects accomplished by the invention and the novel structure and combination of parts through which the purposes of the invention are attained, are set forth and will appear in the course of the following specification.

The drawing accompanying and forming part of the specification is illustrative of a presently preferred embodiment of the invention, but as will appear, structure may be modified and changed as regards this illustration; all within the true intent and scope of the invention.

FIG. 1 is a perspective view of a box having the invention incorporated therein.

FIG. 2 is a broken sectional view showing the box mounted in a wall.

FIG. 3 is a perspective view of one of the U-clips used with the box.

FIG. 4 is a sectional view of one of the clips taken on the plane of line 4—4 of FIG. 3.

FIG. 5 is a top plan view of the box.

The switch or outlet box as shown in FIGS. 1 and 2 may be of conventional design, but differs from the usual forms in that it is provided in the top and bottom walls 7 and 8, with slots 9 and 10, parallel with and spaced back from the front edge of the box a distance approximating the thickness of the wall panel in which the box is to be mounted.

Usually two or three slots are provided to suit two or three different thicknesses of wall structure, but more or less than such number of slots may be provided.

FIGS. 3 and 4 show one of the wall clips, as of U-shaped formation having parallel front and rear legs, 11 and 12, connected by and spaced apart a wall thickness distance by a bridging or connecting portion 13.

FIG. 2 shows how these wall clips are inserted in the box with the rear legs 12 extending out through slots 9 and 10 in the upper and lower walls of the box, over the rear face of the wallboard or other wall structure 14, and the front legs 11 extending over the front edge of the box and over the front face of the wall.

Lugs, tabs or tongues 15, struck out of the rear leg of the clip snap over the box wall as the clip is pushed into place and properly located inner protuberances 16 on the front leg 11, snap over the front edge of the box to hold the clip and lock it in place on the box.

If additional securing is desired, screws 17 may be passed through openings 18 in the front leg and through holes 19 in the intervening wall material into screw seats 20 in the rear leg; the openings 18 in such case serving as guides for drilling the holes through the wall material.

The U-clips may be of thin sheet metal, plastic or other such material, so the slots in the box may be quite narrow, and thus not objectionable, but if there is reason for closing any unused slots, that may be accomplished by closure slides 21. FIGS. 2 and 5, secured in place on top and bottom of the box by screws 22, passed through slots 23 in the slides, into the box walls, enabling any necessary adjustment to close unused slots.

The clip locating and securing lugs 15 are shown struck back out of the inner leg so as to exert a tendency, when engaged with the box wall, to tip the clip forwardly toward the wallboard and the point 16 on the front leg, as it snaps over the edge of the box, exerts a force to firmly grip the clip to the box and to hold the clip in position clamping the wallboard.

The supporting clips are quickly and easily applied to the box and they do not interfere with any normal use and functions of the box.

In practice, it may be found convenient to insert one clip in the box and then use the projecting portion of that clip as a guiding and leverage element for properly locating the box in the wall opening, after which the other clip may be readily applied to lock the opposite end of the box in place in the wall.

While generally or substantially parallel, the wall gripping legs of the clips may be slightly inclined toward each other so as to exert a spring gripping effect on the wall, in final position standing substantially parallel in full engagement with the wall material.

In the final position, the clips hold the box with the front edge substantially flush with the surface of the wall; making certain that the cover plate or other such finishing member will properly fit the wall surface.

The clips are made up in different sizes to suit different standard wall thicknesses and may be packed and sold with boxes slotted for corresponding wall thicknesses.

In practice, the clips may be temporarily connected with boxes with which they are to be used by inverting and inserting them in reverse order over the outside of the boxes so that boxes arrive at the point of use with appropriate clips which then may be withdrawn from the outside and inserted as shown from the inside, into the wall gripping position shown.

The lower edges of the clips may have openings or cutouts such as indicated at 24 to allow for passage of long screws used for mounting switch or receptacle in the box, which screws are engaged and may pass through the mounting lugs 25 on the box.

What is claimed is:
1. Outlet box support comprising the combination of:
   an open front box structure having narrow slots in walls thereof parallel with and spaced approximately the thickness of a wall panel back from the front edge of the box, and

U-shaped clips of thin sheet material to pass through said narrow slots and having rear and front substantially parallel legs spaced apart a distance substantially the thickness of the wall panel in which the box is to be mounted, said clips being disposed inside said box with said rear legs extending out through said slots to engage over the rear face of wall material in which the box may be mounted and said front legs of said clips extending over the front edge of the box structure to engage over the front face of a wall in which the box may be mounted, and slide plates adjustably secured over the slotted walls of the box to cover slots which may not be occupied by the clips.

2. Outlet box support comprising the combination of:

an open front box structure having a narrow slot in one wall thereof parallel with and spaced approximately the thickness of a wall panel from the front edge of the box, and a U-shaped clip of thin sheet material to pass through said narrow slot and having rear and front substantially parallel legs spaced apart a distance substantially the thickness of the wall panel in which the box is to be mounted, said clip being disposed inside said box with said rear leg extending out through said slot to engage over the rear face of wall material in which the box may be mounted and said front leg of said clip extending over the front edge of the box structure to engage over the front face of a wall in which the box may be mounted, said clip having a spring tab struck backward out of the rear leg to snap over the box wall after passage of said leg through said slot to thereby hold said clip in its extended position on the box wall and said front leg of the clip having an inwardly directed protuberance positioned to snap over the outer edge of said box wall to thereby lock the front leg over the front edge of the box and said outer leg being recessed in the mid-portion of the same to expose a switch mounting screw lug projecting from the front edge of the box.

References Cited

UNITED STATES PATENTS

| | | | |
|---|---|---|---|
| 2,039,550 | 5/1936 | Norton | 220—3.6 |
| 2,444,268 | 6/1948 | Peters | 220—3.8 |
| 2,692,697 | 10/1954 | Hamilton et al. | 220—3.6 |
| 2,759,621 | 8/1956 | Hamilton et al. | 220—3.6 |
| 2,831,597 | 4/1958 | Lo Grasso | 220—3.6 |

JOSEPH R. LECLAIR, Primary Examiner

J. R. GARRETT, Assistant Examiner

U.S. Cl. X.R.

248—27